(12) United States Patent
Pan (10) Patent No.: US 11,780,463 B2
(45) Date of Patent: Oct. 10, 2023

(54) METHOD, APPARATUS AND SERVER FOR REAL-TIME LEARNING OF TRAVELLING STRATEGY OF DRIVERLESS VEHICLE

(71) Applicant: Baidu Online Network Technology (Beijing) Co., Ltd., Beijing (CN)

(72) Inventor: Yuchang Pan, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 266 days.

(21) Appl. No.: 16/788,444

(22) Filed: Feb. 12, 2020

(65) Prior Publication Data

US 2020/0262447 A1 Aug. 20, 2020

(30) Foreign Application Priority Data

Feb. 19, 2019 (CN) .......................... 201910124914.1

(51) Int. Cl.
*B60W 60/00* (2020.01)
*G05D 1/00* (2006.01)
*G05D 1/02* (2020.01)

(52) U.S. Cl.
CPC ....... *B60W 60/0011* (2020.02); *G05D 1/0088* (2013.01); *G05D 1/0221* (2013.01);
(Continued)

(58) Field of Classification Search
CPC ........... B60W 60/0011; B60W 60/001; B60W 60/0025; B60W 60/0015; B60W 60/0027;
(Continued)

(56) References Cited

U.S. PATENT DOCUMENTS 8,611,585 B2 12/2013 Zhang et al.
8,880,272 B1* 11/2014 Ferguson .............. B60W 10/20
701/26
(Continued)

FOREIGN PATENT DOCUMENTS

CN 101441076 A 5/2009
CN 101966846 A 2/2011
(Continued)

OTHER PUBLICATIONS

Office Action for Korean Application No. 10-2020-0019971 dated Feb. 23, 2021, 14 pages.
(Continued)

*Primary Examiner* — Anne Marie Antonucci
*Assistant Examiner* — Amelia Vorce
(74) *Attorney, Agent, or Firm* — Patterson Thuente, P.A.

(57) ABSTRACT

A method, apparatus and server for real-time learning of a travelling strategy of a driverless vehicle are provided. The method includes: when a first travelling strategy of the driverless vehicle is unable to be generated, recording travelling trajectories of other vehicles on a road; when a number of vehicles on a same travelling trajectory is greater than a preset first number threshold, generating a second travelling strategy using the same travelling trajectory; and controlling the driverless vehicle to travel using the second travelling strategy. A situation in which a driverless vehicle is unable to normally generate a travelling strategy can be improved effectively.

11 Claims, 5 Drawing Sheets

(52) U.S. Cl.
CPC . *B60W 2554/4046* (2020.02); *B60W 2556/65* (2020.02); *G05D 2201/0213* (2013.01)

(58) Field of Classification Search
CPC ........ B60W 40/09; B60W 2554/4046; B60W 2554/404; B60W 2556/65; B60W 2556/45; G05D 1/0088; G05D 1/0055; G05D 1/0212; G05D 1/0221; G05D 2201/0213; G06K 9/00791; G06K 9/00805
See application file for complete search history.

(56) References Cited

U.S. PATENT DOCUMENTS

| | | | |
|---|---|---|---|
| 9,082,014 | B2 | 7/2015 | Terrazas et al. |
| 9,459,625 | B1 | 10/2016 | Ferguson et al. |
| 9,760,806 | B1 | 9/2017 | Ning et al. |
| 9,812,838 | B2 | 11/2017 | Villeneuve et al. |
| 11,155,262 | B2* | 10/2021 | Avedisov ............... G08G 1/166 |
| 2004/0030476 | A1 | 2/2004 | Oswald et al. |
| 2006/0098872 | A1 | 5/2006 | Seo et al. |
| 2010/0106356 | A1 | 4/2010 | Trepagnier et al. |
| 2011/0282581 | A1 | 11/2011 | Zeng |
| 2014/0032012 | A1 | 1/2014 | Joshi et al. |
| 2014/0136045 | A1 | 5/2014 | Zhu et al. |
| 2017/0092000 | A1 | 3/2017 | Schwimmer |
| 2017/0227968 | A1* | 8/2017 | Klinger ................... H01Q 3/26 |
| 2017/0261318 | A1 | 9/2017 | Takagi et al. |
| 2018/0189599 | A1 | 7/2018 | Sano et al. |
| 2018/0314259 | A1* | 11/2018 | Shami ............... B60W 30/0953 |
| 2018/0342165 | A1* | 11/2018 | Sweeney .............. G08G 1/0112 |
| 2019/0049961 | A1 | 2/2019 | Battles et al. |
| 2019/0084560 | A1* | 3/2019 | Lee ....................... G08G 1/0145 |
| 2019/0088135 | A1* | 3/2019 | Do ....................... G05D 1/0055 |
| 2019/0187725 | A1 | 6/2019 | Zhang et al. |
| 2019/0270408 | A1* | 9/2019 | Castro ..................... B60Q 9/00 |
| 2019/0384294 | A1* | 12/2019 | Shashua ................ G06V 20/584 |
| 2020/0241530 | A1* | 7/2020 | Caveney .................... G06N 5/04 |
| 2021/0053573 | A1* | 2/2021 | Raichelgauz ........... G08G 1/165 |

FOREIGN PATENT DOCUMENTS

| | | |
|---|---|---|
| CN | 102663196 A | 9/2012 |
| CN | 103258338 A | 8/2013 |
| CN | 103649683 A | 3/2014 |
| CN | 103914830 A | 7/2014 |
| CN | 104020674 A | 9/2014 |
| CN | 104331910 A | 11/2014 |
| CN | 104183014 A | 12/2014 |
| CN | 104376297 A | 2/2015 |
| CN | 104422928 A | 3/2015 |
| CN | 104457569 A | 3/2015 |
| CN | 104899855 A | 9/2015 |
| CN | 104933708 A | 9/2015 |
| CN | 104933856 A | 9/2015 |
| CN | 104950883 A | 9/2015 |
| CN | 105761308 A | 7/2016 |
| CN | 105806353 A | 7/2016 |
| CN | 105844600 A | 8/2016 |
| CN | 105957145 A | 9/2016 |
| CN | 106204457 A | 12/2016 |
| CN | 106462757 A | 2/2017 |
| CN | 106585622 A | 4/2017 |
| CN | 106599832 A | 4/2017 |
| CN | 106681318 A | 5/2017 |
| CN | 106845412 A | 6/2017 |
| CN | 106919908 A | 7/2017 |
| CN | 104931977 B | 8/2017 |
| CN | 106997049 A | 8/2017 |
| CN | 107103627 A | 8/2017 |
| CN | 107305383 A | 10/2017 |
| CN | 107657237 A | 2/2018 |
| CN | 107659774 A | 2/2018 |
| CN | 107672589 A | 2/2018 |
| CN | 107678306 A | 2/2018 |
| CN | 107818293 A | 3/2018 |
| CN | 107832806 A | 3/2018 |
| CN | 107976688 A | 5/2018 |
| CN | 107993512 A | 5/2018 |
| CN | 108010360 A | 5/2018 |
| CN | 207407892 U | 5/2018 |
| CN | 108156419 A | 6/2018 |
| CN | 108256506 A | 7/2018 |
| CN | 108323190 A | 7/2018 |
| CN | 108492356 A | 9/2018 |
| CN | 108646735 A | 10/2018 |
| CN | 108698600 A | 10/2018 |
| CN | 109101022 A | 12/2018 |
| EP | 3346237 A1 | 7/2018 |
| JP | 2004078333 A | 3/2004 |
| JP | 2005242552 A | 9/2005 |
| JP | 2006313519 A | 11/2006 |
| JP | 2009157419 A | 7/2009 |
| JP | 4605762 B2 | 1/2011 |
| JP | WO 2012/001755 A1 | 8/2013 |
| JP | 2015079223 A | 4/2015 |
| JP | 2015207171 A | 11/2015 |
| JP | 2017091273 A | 5/2017 |
| JP | 2018060511 A | 4/2018 |
| JP | 2018060512 A | 4/2018 |
| KR | 20160047087 A | 5/2016 |
| KR | 20180025603 A | 3/2018 |
| RO | 132599 A2 | 5/2018 |
| TW | 200945245 A | 11/2009 |
| TW | 201643063 A | 12/2016 |
| WO | WO 2018/138584 A1 | 8/2018 |
| WO | WO-2018198163 A1 | 11/2018 |
| WO | WO-2021135371 A * | 7/2021 ............ B60W 50/02 |

OTHER PUBLICATIONS

Abdelhamid Mammeri et al., "Extending the Detection Range of Vision-Based Vehicular Instrumentation," IEEE Transactions on Instrumentation and Measurement, IEEE Service Center, Piscataway, NJ, US, vol. 65, No. 4, Apr. 1, 2016, pp. 856-873, XP011602110, ISSN: 0018-9456, DOI: 10.1109/TIM.2016.2514780.

Xiangyu Yue et al., "A LiDAR Point Cloud Generator: from a Virtual World to Autonomous Driving," ARXIV: 1804.00103V1, arxiv.org, Cornell University Library, 201 OLIN Library Cornell University Ithaca, NY 14853, Mar. 31, 2018, XP081225058, Retrieved from Internet: URL: https://arxiv.org/abs/1804.00103, 7 pages.

Christopher Gustav Keller et al., "Real-time recognition of U.S. speed signs," Intelligent Vehicles Symposium, 2008 IEEE, IEEE Piscataway, NJ, USA, Jun. 4, 2008, pp. 518-823, XP031318927, ISBN: 978-1-4244-2568-6.

Gijs Dubbelman, "Vision based Obstacle Detection for both Day and Night Conditions," Dec. 31, 2006, XP055618096, Retrieved from the Internet: URL: https://staff.fnwi.uva.nl/a.visser/research/ias/alumni/m.sc.theses/theses/GijsDubbelman.pdf, 126 pages.

Alireza Asvadi et al., "DepthCN: Vehicle detection using 3D-LIDAR and ConvNet," 2017 IEEE 20th International Conference on Intelligent Transportation Systems (ITSC), IEEE, Oct. 16, 2017, pp. 1-6, XP033330533, DOI: 10.1109/ITSC.2017.8317880.

Agnieszka Mikolajczyk et al., "Data augmentation for improving deep learning in image classification problem," 2018 International Interdisciplinary PHD Workshop (TTPHDW), IEEE, May 9, 2018, pp. 117-122, XP033360783, DOI: 10.1109/IIPHDW.2018.8388338.

Raymond A. Yeh et al., "Semantic Image Inpainting with Deep Generative Models," ARXIV—1611.07004V2, Nov. 14, 2016, pp. 6882-6890, XP055532717, DOI: 10.1109/CVPR.2017.728, ISBN: 978-1-5386-0457-1.

Xtaohu Lu et al., "Pairwise Linkage for Point Cloud Segmentation," ISPRS Annals of Photogrammetry, Remote Sensing and Spatial Information Sciences, vol. III-3, Jun. 3, 2016, pp. 201-208, XP055647625, DOI: 10.5194/isprs-annals-III-3-201-2016.

Ma Ling, et al., "The Principle of Microwave Velocity Radar," College of Electronic Engineering and Optoelectronic Technology, NUST, Nanjing, 210094, Journal of Ballistics, vol. 15, No. 4, Dec. 31, 2003, 5 pages.

(56) References Cited

OTHER PUBLICATIONS

A. Mantovanelli, et al., "The Use of HR radar surface currents for computing Lagrangian trajectories: benefits and issues," Ocean 10 IEEE Sydney, May 27, 2010, 6 pages.
CN Application No. CN201910124914.1, First Office Action, dated Feb. 3, 2020, 21 pages.
Search Report, Application No. 2019101249141, dated Jan. 19, 2020, 6 pages.
European Search Report, European Application No. EP20275039.4, dated Jul. 5, 2020, 9 pages.
Liting Sun et al., "A Fast Integrated Planning and Control Framework for Autonomous Driving via Imitation Learning", ARXIV.org, Cornell University Library, 201 Olin Library Cornell University Ithaca, NY 14853, Jul. 9, 2017, XP080775334, 8 pages.
Office Action For Japanese Application No. 2020-023905, dated Mar. 23, 2021, 7 pages.

\* cited by examiner

METHOD, APPARATUS AND SERVER FOR REAL-TIME LEARNING OF TRAVELLING STRATEGY OF DRIVERLESS VEHICLE

CROSS-REFERENCE TO RELATED APPLICATION

This application claims priority to Chinese Patent Application No. 201910124914.1, entitled "Method, Apparatus, and Server for Real-Time Learning of Travelling Strategy of Driverless Vehicle", and filed on Feb. 19, 2019, which is hereby incorporated by reference in its entirety.

TECHNICAL FIELD

The present disclosure relates to driverless vehicles, and particularly to a method, apparatus, server, system and device for real-time learning of a travelling strategy of a driverless vehicle, and a storage medium.

BACKGROUND

During a travelling of a driverless vehicle, a travelling strategy may be generated according to routing information, surrounding obstacle information, self-state information and the like, to control the travel of the driverless vehicle based on the travelling strategy.

SUMMARY

The embodiments of the present disclosure provide a method, apparatus, server, system and device for real-time learning of a travelling strategy of a driverless vehicle, and a storage medium, so as to at least solve the above technical problems in the existing technology.

According to a first aspect, a method for real-time learning of a travelling strategy of a driverless vehicle, includes:

when a first travelling strategy of the driverless vehicle is unable to be generated, recording travelling trajectories of other vehicles on a road;

when a number of vehicles on a same travelling trajectory is greater than a preset first number threshold, generating a second travelling strategy using the same travelling trajectory; and controlling the driverless vehicle to travel using the second travelling strategy.

In an embodiment, the method further includes:

reporting the second travelling strategy to a server, and/or transmitting the second travelling strategy to at least one other driverless vehicle.

In an embodiment, the method further includes:

when a third travelling strategy is received from a server, determining whether the first travelling strategy is able to be generated by the driverless vehicle; controlling the driverless vehicle to travel using the first travelling strategy and transmitting to the server a report indicating that a second driverless vehicle does not use the third travelling strategy, if the first travelling strategy is able to be generated by the driverless vehicle; and controlling the driverless vehicle to travel using the third travelling strategy, if the first travelling strategy is unable to be generated by the driverless vehicle.

In an embodiment, the method further includes:

when the second travelling strategy is received from the at least one other driverless vehicle, determining whether the first travelling strategy is able to be generated by the driverless vehicle; controlling the driverless vehicle to travel using the first travelling strategy, if the first travelling strategy is able to be generated by the driverless vehicle; and controlling the driverless vehicle to travel using the second travelling strategy, if the first travelling strategy is unable to be generated by the driverless vehicle.

According to a second aspect, a method for real-time learning of a travelling strategy of a driverless vehicle, includes:

receiving a second travelling strategy from a first driverless vehicle, and obtaining a position corresponding to the second travelling strategy; and when the number of received same second travelling strategies is greater than a preset second number threshold, determining the same second travelling strategy as a third travelling strategy, and storing the third travelling strategy and the corresponding position.

In an embodiment, the method further includes:

when a distance from a second driverless vehicle to a position corresponding to the third travelling strategy is detected to be less than a preset distance threshold, transmitting the third travelling strategy to the second driverless vehicle.

In an embodiment, the method further includes:

when the number of received reports indicating that the second driverless vehicle does not use the third travelling strategy exceeds a preset third number threshold, deleting the third travelling strategy and the corresponding position.

According to a third aspect, an apparatus for real-time learning of a travelling strategy of a driverless vehicle, includes:

a recording module configured to, when a first travelling strategy of the driverless vehicle is unable to be generated, record travelling trajectories of other vehicles on a road;

a generating module configured to when a number of vehicles on the same travelling trajectory is greater than a preset first number threshold, generate a second travelling strategy using a same travelling trajectory; and a controlling module configured to control the driverless vehicle to travel using the second travelling strategy.

In an embodiment, the apparatus further includes:

a reporting module configured to report the second travelling strategy to a server, and/or to transmit the second travelling strategy to the at least one other driverless vehicle.

In an embodiment, the controlling module is further configured to:

when a third travelling strategy is received from a server, determine whether the first travelling strategy is able to be generated by the driverless vehicle; control the driverless vehicle to travel using the first travelling strategy and transmit to the server a report indicating that the second driverless vehicle does not use the third travelling strategy, if the first travelling strategy is able to be generated by the driverless vehicle; and control the driverless vehicle to travel using the third travelling strategy, if the first travelling strategy is unable to be generated by the driverless vehicle.

In an embodiment, the controlling module is further configured to:

determine whether the first travelling strategy is able to be generated by the driverless vehicle, when the second travelling strategy is received from the at least one other driverless vehicle; control the driverless vehicle to travel using the first travelling strategy, if the first travelling strategy is able to be generated by the driverless vehicle; and control the driverless vehicle to travel using the second travelling strategy, if the first travelling strategy is unable to be generated by the driverless vehicle.

According to a fourth aspect, a server for real-time learning of a travelling strategy of a driverless vehicle, includes:

a receiving and obtaining module configured to receive a second travelling strategy from a first driverless vehicle, and obtain a position corresponding to the second travelling strategy; and a storing module configured to when the number of the received same second travelling strategies is greater than a preset second number threshold, determine the same second travelling strategy as a third travelling strategy, and store the third travelling strategy and the corresponding position.

In an embodiment, the server further includes:

a transmitting module configured to, when a distance from a second driverless vehicle to a position corresponding to the third travelling strategy is detected to be less than a preset distance threshold, transmit the third travelling strategy to the second driverless vehicle.

In an embodiment, the server further includes:

a deleting module configured to, when the number of received reports indicating that the second driverless vehicle does not use the third travelling strategy exceeds a preset third number threshold, delete the third travelling strategy and the corresponding position.

According to a fifth aspect, a system for real-time learning of a travelling strategy of a driverless vehicle, includes the apparatus according to any one of the embodiments of the third aspect and the server according to any one of the embodiments of the fourth aspect.

According to a sixth aspect, a device for real-time learning of a travelling strategy of a driverless vehicle is provided, and the functions thereof can be implemented by hardware or by hardware to execute corresponding software. The hardware or the software includes one or more modules corresponding to the above functions.

In a possible embodiment, the structure of the device includes a memory configured to store a program for supporting the device to perform the above method for real-time learning of a travelling strategy of a driverless vehicle, and a processor configured to execute the program stored in the memory. The device may further include a communication interface configured to be communicated with other device or a communication network.

According to a seventh aspect, a non-volatile computer-readable storage medium is provided for storing computer software instructions used by a device for real-time learning of a travelling strategy of an driverless vehicle, and the computer software instructions include programs involved in execution of the method for real-time learning of a travelling strategy of a driverless vehicle.

The above technical solution improves the following advantages or beneficial effects: when a first travelling strategy is unable to be normally generated by a vehicle, the vehicle may learn the travelling trajectories of other vehicles in real time, so that a second travelling strategy is generated based on the learned travelling trajectory, and the driverless vehicle is controlled to travel using the second travelling strategy.

The above summary is for the purpose of the specification only and is not intended to be limiting in any way. In addition to the illustrative aspects, embodiments, and characters described above, further aspects, embodiments, and characters of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION OF THE EMBODIMENTS

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

Here, the routing solves an issue of the driverless vehicle from a start point to a destination, and the routing information is generated depending on a high-precision map (HD-Map) of the driverless vehicle. The travelling strategy determines the travelling situations of the driverless vehicles, which normally includes: following a vehicle on a road, waiting at the traffic lights, yielding before the pedestrians, and passing by other vehicles at intersection. For example, the routing information requires the driverless vehicle to keep travelling in the current lane, and another vehicle is travelling in front of this driverless vehicle. In this case, the travelling strategy is likely to be following another vehicle.

Under some special situations, the driverless vehicle is unable to generate the travelling strategy normally. For example, the road is closed temporarily, and a high-precision map is not modified. When the driverless vehicle travels to the temporarily closed road, it cannot continue travelling with an obstacle ahead based on the previous routing information. In this case, the driverless vehicle is unable to normally generate a travelling strategy.

In the existing technology, when the travelling strategy is unable to be normally generated, the driverless vehicle cannot deal with the situations effectively.

The present disclosure mainly provides a method and apparatus for real-time learning of a travelling strategy of a driverless vehicle. The details will be described by the following embodiments.

Figure 1:
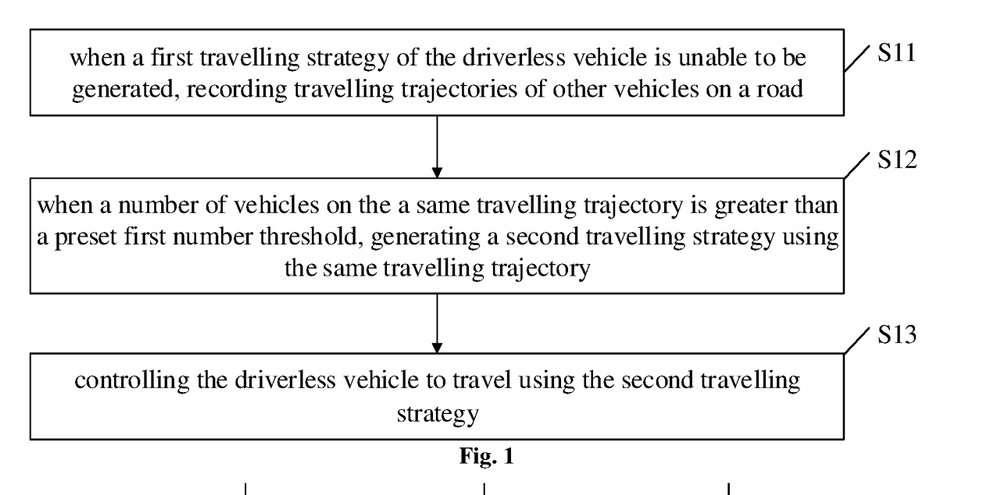
FIG. 1 illustrates a flowchart of a method for real-time learning of a travelling strategy of a driverless vehicle according to an embodiment of the present disclosure.

FIG. 1 illustrates a flowchart of a method for real-time learning of a travelling strategy of a driverless vehicle according to an embodiment of the present disclosure. As illustrated in FIG. 1, the method includes:

S11: when a first travelling strategy of the driverless vehicle is unable to be generated, recording travelling trajectories of other vehicles on a road;

S12: when a number of vehicles on a same travelling trajectory is greater than a preset first number threshold, generating a second travelling strategy using the same travelling trajectory; and S13: controlling the driverless vehicle to travel using the second travelling strategy.

Figure 2:
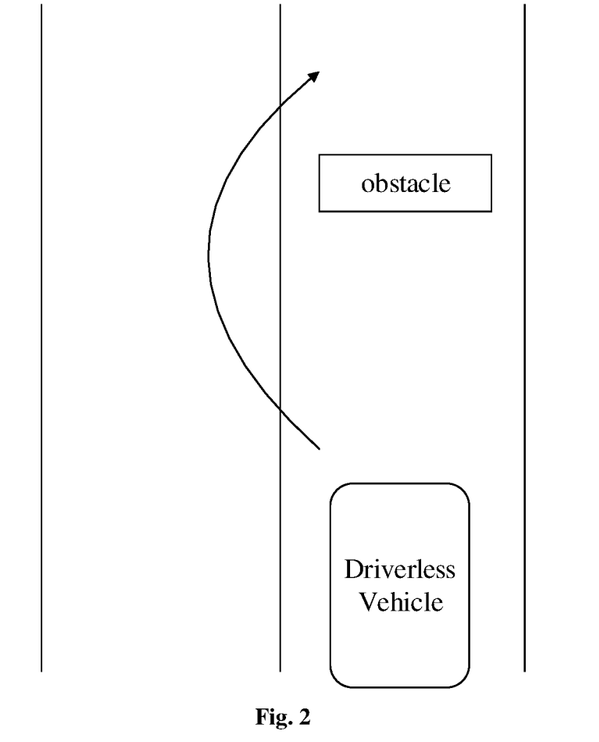
FIG. 2 is a schematic diagram of an application scene according to an embodiment of the present disclosure.

FIG. 2 is a schematic diagram of an application scene according to an embodiment of the present disclosure. In FIG. 2, the driverless vehicle travels in a right lane, and a left lane is a reverse lane. In a running process, the driverless vehicle senses a static obstacle ahead, while the routing information intends to go straight along the current lane. Since the routing information is not consistent with the sense information, the driverless vehicle is unable to normally generate a travelling strategy.

In a possible embodiment, when the driverless vehicle is unable to generate a travelling strategy (hereinafter, the travelling strategy generated by the driverless vehicle using the existing technology is referred to a first travelling strategy), it may stop at a safe position and record the travelling trajectories of other vehicles on the road. As illustrated in FIG. 2, an arrowed curve shows a travelling trajectory related to other vehicles. Here, 'the travelling trajectories of other vehicle' does not mean that the other vehicles are travelling exactly along this route, but represents a travelling strategy of other vehicles. For example in FIG. 2, the travelling trajectory illustrated by the arrowed curve may indicate to temporarily occupy the left reverse lane in order to avoid the obstacle, and to return to the right lane and continue to go straight.

When the number of vehicles on the same travelling trajectory is greater than a preset first number threshold, it is reasonable to use this travelling trajectory according to the embodiments of the present disclosure. A second travelling strategy is able to be generated based on the same travelling trajectory, and the driverless vehicle may be controlled using the second travelling strategy.

Further, the driverless vehicle may report the generated second travelling strategy to a server. When the number of the received same second travelling strategies is greater than a preset second number threshold, the server determines that the same second travelling strategy is valid and sets the same second travelling strategy as a third travelling strategy. The server may provide the third travelling strategy to other driverless vehicles for reference.

Alternatively, the driverless vehicle may further transmit the generated second travelling strategy to other driverless vehicles for reference. For example, the driverless vehicle may transmit the second travelling strategy to other driverless vehicles within a detected range of the driverless vehicle.

Hereinafter, the driverless vehicle that generates the second travelling strategy is referred to a first driverless vehicle, and the driverless vehicle that receives the second travelling strategy (from the first driverless vehicle) or the third travelling strategy (from the server) is referred to a second driverless vehicle.

When the second driverless vehicle receives the third travelling strategy and is able to be generate the first travelling strategy, the second driverless vehicle may report this situation to the server. For example, as illustrated in FIG. 2, after the obstacle on the road is removed, the second driverless vehicle is able to generate the first traveling strategy when travelling thereon.

The server may delete the third travelling strategy when receiving the information reported by the second driverless vehicle several times.

Figure 3:
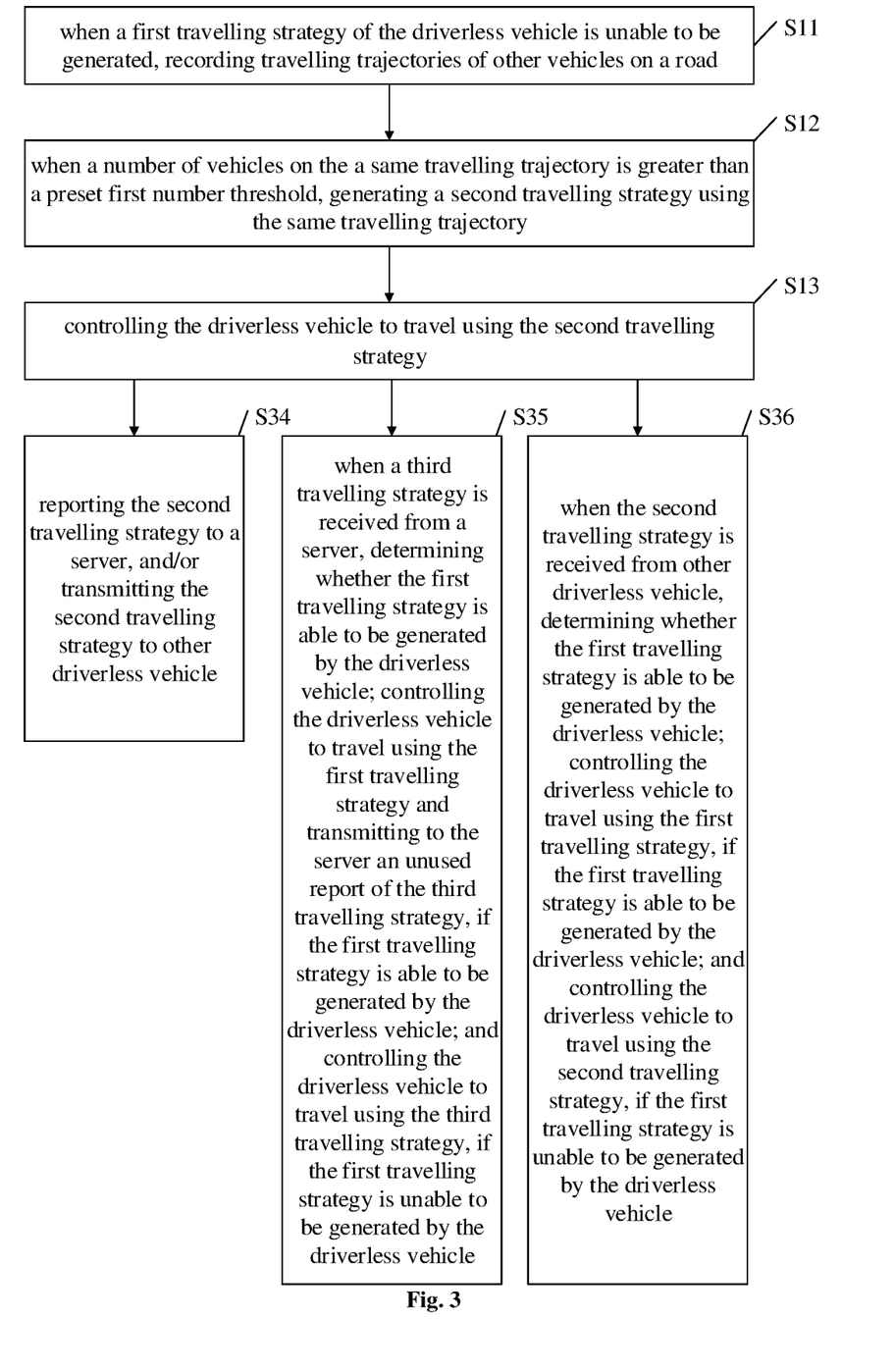
FIG. 3 illustrates a flowchart of another method for real-time learning of a travelling strategy of a driverless vehicle according to an embodiment of the present disclosure.

Based on the above, a flowchart of another method for real-time learning of a travelling strategy of a driverless vehicle is provided. As illustrated in FIG. 3, the method includes:

S11: when a first travelling strategy of the driverless vehicle is unable to be generated, recording travelling trajectories of other vehicles on a road.

S12: when a number of vehicles on a same travelling trajectory is greater than a preset first number threshold, generating a second travelling strategy using the same travelling trajectory.

S13: controlling the driverless vehicle to travel using the second travelling strategy.

S11 to S13 are the same as the above embodiment, and will not be described again.

S34: reporting the second travelling strategy to a server, and/or transmitting the second travelling strategy to other driverless vehicle.

Since the other driverless vehicles are nearby the detected range of the driverless vehicles, the other driverless vehicles in the detected range of the driverless vehicles are likely unable to generate the first travelling strategy. The second travelling strategy may be directly transmitted to other driverless vehicles within the detected range for reference.

In a possible embodiment, the second travelling strategy may be transmitted to other driverless vehicles in a same travelling direction as the main driverless vehicle.

S35: when a third travelling strategy is received from a server, determining whether the first travelling strategy is able to be generated by the driverless vehicle; controlling the driverless vehicle to travel using the first travelling strategy and transmitting to the server a report indicating that the second driverless vehicle does not use the third travelling strategy, if the first travelling strategy is able to be generated by the driverless vehicle; and controlling the driverless vehicle to travel using the third travelling strategy, if the first travelling strategy is unable to be generated by the driverless vehicle.

In a possible embodiment, if the third travelling strategy is used to control the driverless vehicle, a used report of the third travelling strategy may be reported to the server. The server may record relevant information such as the times and the duration of using the third travelling strategy. When the duration of using the third travelling strategy is long, it indicates that the temporary road conditions corresponding to the position may become the long-term road conditions. Thus, information related to the road in the high-precision map may be updated as needed.

S36: when the second travelling strategy is received from the at least one other driverless vehicle, determining whether the first travelling strategy is able to be generated by the driverless vehicle; controlling the driverless vehicle to travel using the first travelling strategy, if the first travelling strategy is able to be generated by the driverless vehicle; and controlling the driverless vehicle to travel using the second travelling strategy, if the first travelling strategy is unable to be generated by the driverless vehicle.

The above S34 to S36 describe three different embodiments, and they are not limited in their execution orders.

Figure 4:
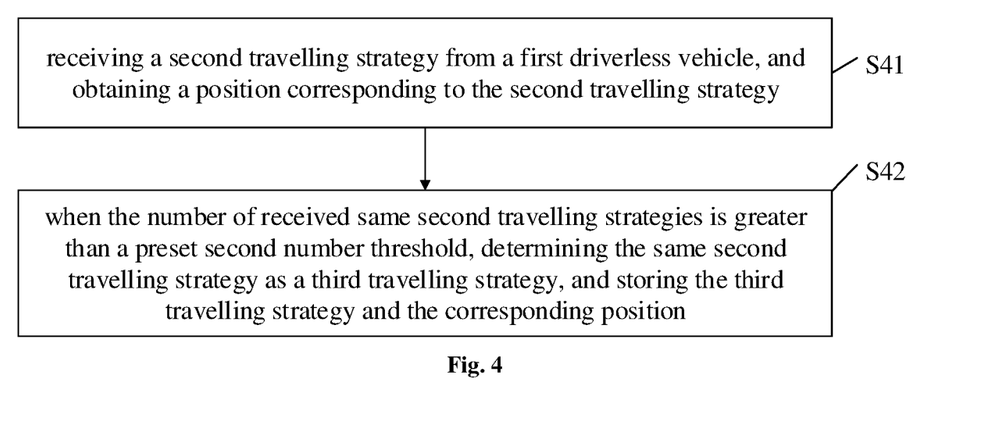
FIG. 4 illustrates a flowchart of another method for real-time learning of a travelling strategy of a driverless vehicle according to an embodiment of the present disclosure.

Another method for real-time learning of a travelling strategy of a driverless vehicle is provided, which may be applied to a server side. FIG. 4 illustrates a flowchart of the method, includes:

S41: receiving a second travelling strategy from a first driverless vehicle, and obtaining a position corresponding to the second travelling strategy.

In a possible embodiment, the position corresponding to the second travelling strategy may be a position at which the first driverless vehicle generates or transmits the second travelling strategy, or a position of an obstacle resulting in that the first driverless vehicle is unable to generate the first travelling strategy.

S42: when the number of received same second travelling strategies is greater than a preset second number threshold, determining the same second travelling strategy as a third travelling strategy, and storing the third travelling strategy and the corresponding position.

Figure 5:
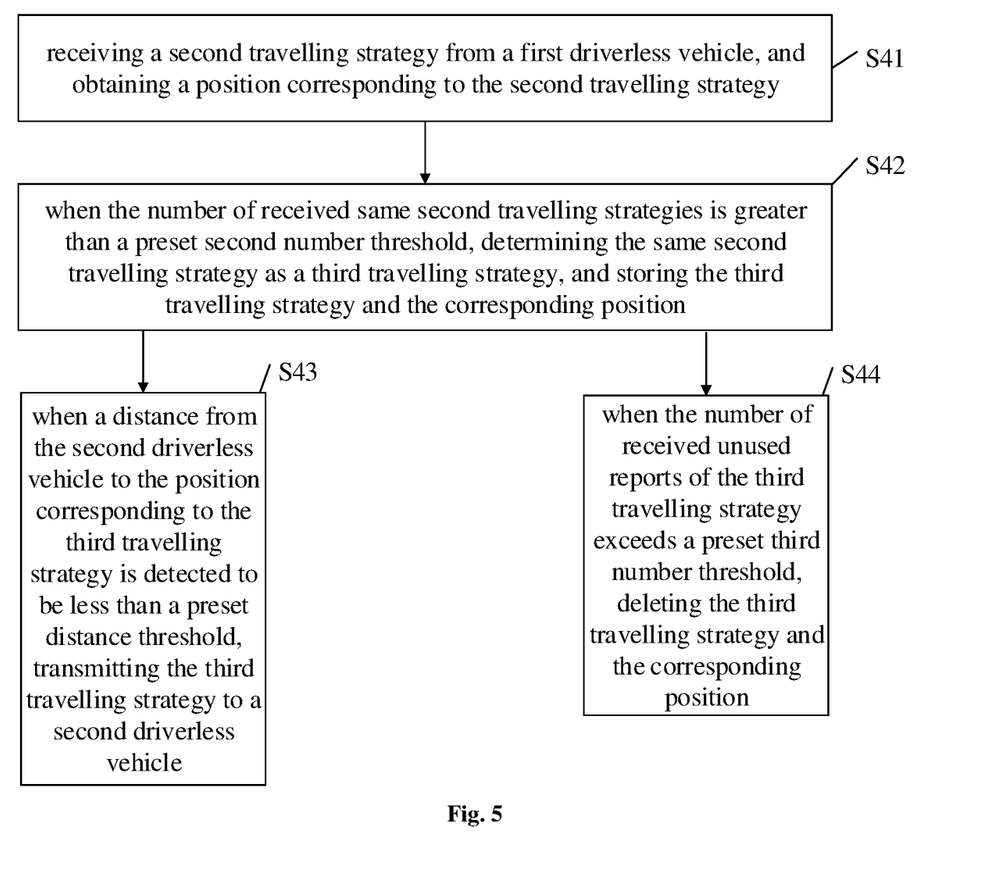
FIG. 5 illustrates a flowchart of another method for real-time learning of a travelling strategy of a driverless vehicle according to an embodiment of the present disclosure.

Another method for real-time learning of a travelling strategy of a driverless vehicle is provided, which may be applied to a server side. FIG. 5 illustrates a flowchart of the method, includes:

S41: receiving a second travelling strategy from a first driverless vehicle, and obtaining a position corresponding to the second travelling strategy.

S42: when the number of received same second travelling strategies is greater than a preset second number threshold, determining the same second travelling strategy as a third travelling strategy, and storing the third travelling strategy and the corresponding position.

S43: when a distance from a second driverless vehicle to a position corresponding to the third travelling strategy is detected to be less than a preset distance threshold, transmitting the third travelling strategy to the second driverless vehicle.

When a distance from the second driverless vehicle to the obtained position is less than a preset distance threshold, it indicates that the second driverless vehicle will be unable to generate the first travelling strategy. At this point, the second travelling strategy may be transmitted to the second driverless vehicle for reference.

In a possible embodiment, the server may transmit the second travelling strategy to the second driverless vehicle in the same travelling direction as the first driverless vehicle.

S44: when the number of received reports indicating that the second driverless vehicle does not use the third travelling strategy exceeds a preset third number threshold, deleting the third travelling strategy and the corresponding position.

In a possible embodiment, the used reports of the third travelling strategy may be received from the second driverless vehicle. For a certain third travelling strategy, when the number of received used reports of the third travelling strategy or duration exceeds a preset threshold, information related to the road in the high-precision map may be updated accordingly.

Figure 6:
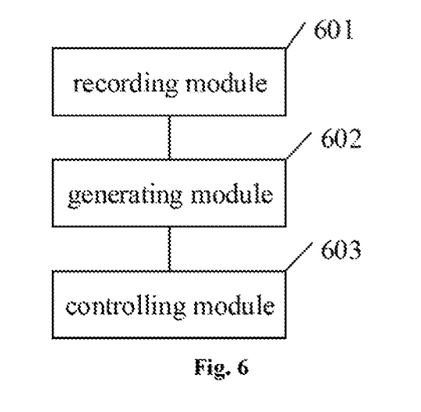
FIG. 6 illustrates a schematic diagram of an apparatus for real-time learning of a travelling strategy of a driverless vehicle according to an embodiment of the present disclosure.

An apparatus for real-time learning of a travelling strategy of a driverless vehicle is provided. FIG. 6 illustrates a schematic diagram of an apparatus for real-time learning of a travelling strategy of a driverless vehicle according to an embodiment of the present disclosure, includes:

a recording module 601 configured to, when a first travelling strategy of the driverless vehicle is unable to be generated, record travelling trajectories of other vehicles on a road.

a generating module 602 configured to when a number of vehicles on the same travelling trajectory is greater than a preset first number threshold, generate a second travelling strategy using a same travelling trajectory.

a controlling module 603 configured to control the driverless vehicle to travel using the second travelling strategy.

Figure 7:
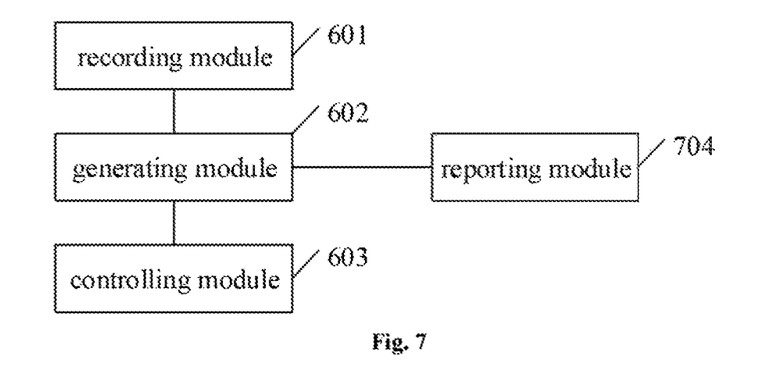
FIG. 7 illustrates a schematic diagram of another apparatus for real-time learning of a travelling strategy of a driverless vehicle according to an embodiment of the present disclosure.

Another apparatus for real-time learning of a travelling strategy of a driverless vehicle is provided. FIG. 7 is a schematic diagram of the apparatus, includes:

a recording module 601 configured to, when a first travelling strategy of the driverless vehicle is unable to be generated, record travelling trajectories of other vehicles on a road.

a generating module 602 configured to when a number of vehicles on the same travelling trajectory is greater than a preset first number threshold, generate a second travelling strategy using a same travelling trajectory.

a controlling module 603 configured to control the driverless vehicle to travel using the second travelling strategy.

a reporting module 704 configured to report the second travelling strategy to a server, and/or to transmit the second travelling strategy to other driverless vehicles.

In a possible embodiment, the controlling module 603 is further configured to:

when a third travelling strategy is received from a server, determine whether the first travelling strategy is able to be generated by the driverless vehicle; control the driverless vehicle to travel using the first travelling strategy and transmit to the server a report indicating that the second driverless vehicle does not use the third travelling strategy, if the first travelling strategy is able to be generated by the driverless vehicle; and control the driverless vehicle to travel using the third travelling strategy, if the first travelling strategy is unable to be generated by the driverless vehicle.

In a possible embodiment, the controlling module 603 is further configured to:

determine whether the first travelling strategy is able to be generated by the driverless vehicle, when the second travelling strategy is received from other driverless vehicle; control the driverless vehicle to travel using the first travelling strategy, if the first travelling strategy is able to be generated by the driverless vehicle; and control the driverless vehicle to travel using the second travelling strategy, if the first travelling strategy is unable to be generated by the driverless vehicle.

Figure 8:
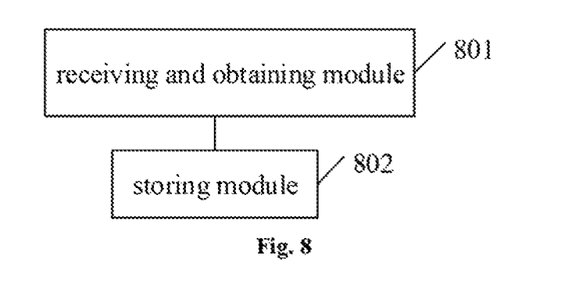
FIG. 8 illustrates a schematic diagram of a server for real-time learning of a travelling strategy of a driverless vehicle according to an embodiment of the present disclosure.

A server for real-time learning of a travelling strategy of a driverless vehicle is provided. FIG. 8 is a schematic diagram of the server, includes:

a receiving and obtaining module 801 configured to receive a second travelling strategy from a first driverless vehicle, and obtain a position corresponding to the second travelling strategy.

a storing module 802 configured to when the number of the received same second travelling strategies is greater than a preset second number threshold, determine the same second travelling strategy as a third travelling strategy, and store the third travelling strategy and the corresponding position.

Figure 9:
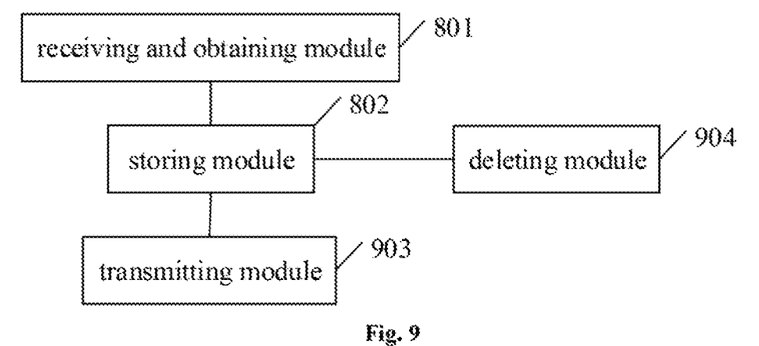
FIG. 9 illustrates a schematic diagram of another server for real-time learning of a travelling strategy of a driverless vehicle according to an embodiment of the present disclosure.

Another server for real-time learning of a travelling strategy of a driverless vehicle is provided. FIG. 9 is a schematic diagram of the server, includes:

a receiving and obtaining module 801 configured to receive a second travelling strategy from a first driverless vehicle, and obtain a position corresponding to the second travelling strategy.

a storing module 802 configured to when the number of the received same second travelling strategies is greater than a preset second number threshold, determine the same second travelling strategy as a third travelling strategy, and store the third travelling strategy and the corresponding position.

a transmitting module 903 configured to, when a distance from a second driverless vehicle to a position corresponding to the third travelling strategy is detected to be less than a preset distance threshold, transmit the third travelling strategy to the second driverless vehicle.

a deleting module 904 configured to, when the number of received reports indicating that the second driverless vehicle does not use the third travelling strategy exceeds a preset third number threshold, delete the third travelling strategy and the corresponding position.

The function of each of the modules in the apparatus according to the embodiments of the present disclosure may refer to descriptions in the above method, and will not be repeated here.

A system for real-time learning of a travelling strategy of a driverless vehicle is provided, including a server and the apparatuses according to the above embodiments, wherein each apparatus may be provided on one driverless vehicle. Each apparatus is communicatively connected to the server, and the apparatuses may also be communicatively connected to each other. The communicative connections between the apparatus and the server, and among the apparatuses can be realized in a Vehicle to Everything (V2X) mode.

Figure 10:
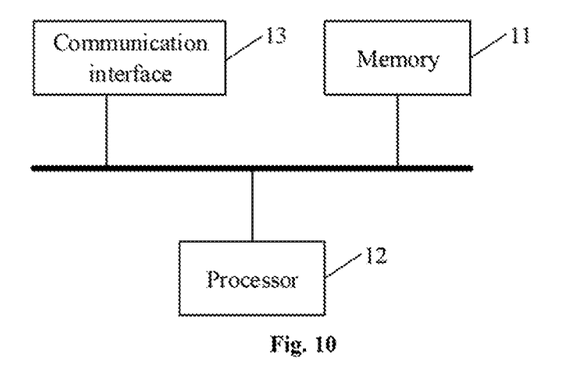
FIG. 10 illustrates a schematic diagram of a device for real-time learning of a travelling strategy of a driverless vehicle according to an embodiment of the present disclosure.

A device for real-time learning of a travelling strategy of a driverless vehicle is provided. FIG. 10 illustrates a schematic diagram of a device for real-time learning of a travelling strategy of a driverless vehicle according to an embodiment of the present disclosure, includes:

a memory 11 and a processor 12, wherein a computer program executable on the processor 12 is stored in the memory 11. When the processor 12 executes the computer program, the method for real-time learning of a travelling strategy of a driverless vehicle in the above embodiment is implemented. There may be one or more memories 11 and one or more processors 12.

The device may further include a communication interface 13 configured to communicate with an external device for a data interactive transmission.

The memory 11 may include a high-speed random access memory (RAM), and may also include a non-volatile memory, such as at least one disk memory.

If the memory 11, the processor 12, and the communication interface 13 are implemented independently, the memory 11, the processor 12, and the communication interface 13 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 10, but it does not mean that there is only one bus or one type of bus.

Optionally, in a specific implementation, if the memory 11, the processor 12, and the communication interface 13 are integrated on one chip, the memory 12, the processor 12, and the communication interface 13 may implement mutual communication through an internal interface.

According to an embodiment of the present disclosure, a non-volatile computer-readable storage medium is provided for storing computer software instructions, which include programs involved in execution of the above method.

In the description of the specification, the description of the terms "one embodiment," "some embodiments," "an example," "a specific example," or "some examples" and the like means the specific characters, structures, materials, or characteristics described in connection with the embodiment or example are included in at least one embodiment or example of the present application. Furthermore, the specific characters, structures, materials, or characteristics described may be combined in any suitable manner in any one or more of the embodiments or examples. In addition, different embodiments or examples described in this specification and characters of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical characters. Thus, characters defining "first" and "second" may explicitly or implicitly include at least one of the characters. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any non-volatile computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "non-volatile computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the non-volatile computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a non-volatile computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

The invention claimed is:

1. A method for real-time learning of a travelling strategy of a driverless vehicle, comprising:
   determining whether a first travelling strategy of the driverless vehicle is unable to be generated according to routing information depending on a high-precision map and surrounding obstacle information of the driverless vehicle;
   in response to determining that the first travelling strategy of the driverless vehicle is unable to be generated according to the routing information depending on the high-precision map and the surrounding obstacle information, of the driverless vehicle, recording travelling trajectories of other vehicles on a road;
   when a number of vehicles on a same travelling trajectory is greater than a preset first number threshold, generating a second travelling strategy using the same travelling trajectory; and
   controlling the driverless vehicle to travel using the second travelling strategy,
   wherein the method further comprises:
   when a third travelling strategy is received by a second driverless vehicle from a server, determining whether the first travelling strategy is able to be generated by the second driverless vehicle; and,
   in response to the first travelling strategy being unable to be generated by the second driverless vehicle, controlling the second driverless vehicle to travel using the third travelling strategy and transmitting a used report indicating that the third travelling strategy has been used to the server, such that the server records a number of used reports and a duration of receiving used reports, and updates the high-precision map in response to the number of used reports is greater than a report threshold or the duration is longer than a duration threshold.

2. The method according to claim 1, further comprising:
   reporting the second travelling strategy to the server, and/or transmitting the second travelling strategy to at least one other driverless vehicle.

3. The method according to claim 1, further comprising:
   controlling the second driverless vehicle to travel using the first travelling strategy and transmitting to the server a report indicating that the second driverless vehicle does not use the third travelling strategy, if the first travelling strategy is able to be generated by the second driverless vehicle.

4. A non-volatile computer-readable storage medium storing a computer program, wherein the computer program implements the method according to claim 1 when being executed by a processor.

5. An apparatus for real-time learning of a travelling strategy of a driverless vehicle, comprising:
   one or more processors;
   a storage device configured to store one or more programs;
   wherein the one or more programs are executed by the one or more processors to enable the one or more processors to:
   determine whether a first travelling strategy of the driverless vehicle is unable to be generated according to routing information depending on a high-precision map and surrounding obstacle information of the driverless vehicle;
   in response to determining that the first travelling strategy of the driverless vehicle is unable to be generated according to the routing information depending on the high-precision map and the surrounding obstacle information, of the driverless vehicle, record travelling trajectories of other vehicles on a road;
   when a number of vehicles on a same travelling trajectory is greater than a preset first number threshold, generate a second travelling strategy using the same travelling trajectory; and
   control the driverless vehicle to travel using the second travelling strategy,
   wherein the one or more programs are executed by the one or more processors to enable the one or more processors further to:
   when a third travelling strategy is received by a second driverless vehicle from a server, determine whether the first travelling strategy is able to be generated by the second driverless vehicle;
   in response to the first travelling strategy being unable to be generated by the second driverless vehicle, control the second driverless vehicle to travel using the third travelling strategy and transmit a used report indicating that the third travelling strategy has been used to the server, such that the server records a number of used reports and a duration of receiving used reports, and updates the high-precision map in response to the number of used reports is greater than a report threshold or the duration is longer than a duration threshold.

6. The apparatus according to claim 5, wherein the one or more programs are executed by the one or more processors to enable the one or more processors to:
report the second travelling strategy to the server, and/or to transmit the second travelling strategy to at least one other driverless vehicle.

7. The apparatus according to claim 5, wherein the one or more programs are executed by the one or more processors to enable the one or more processors to:
control the second driverless vehicle to travel using the first travelling strategy and transmit to the server a report indicating that the second driverless vehicle does not use the third travelling strategy, if the first travelling strategy is able to be generated by the second driverless vehicle.

8. A server for real-time learning of a travelling strategy of a driverless vehicle, comprising:
one or more processors;
a storage device configured to store one or more programs;
wherein the one or more programs are executed by the one or more processors to enable the one or more processors to:
receive a second travelling strategy from a first driverless vehicle, and obtain a position corresponding to the second travelling strategy; wherein the second travelling strategy is generated by: determining whether a first travelling strategy of the first driverless vehicle is unable to be generated according to routing information depending on a high-precision map and surrounding obstacle information, of the first driverless vehicle; in response to determining that the first travelling strategy of the first driverless vehicle is unable to be generated according to the routing information depending on the high-precision map and the surrounding obstacle information, of the first driverless vehicle, recording travelling trajectories of other vehicles on a road; when a number of vehicles on a same travelling trajectory is greater than a preset first number threshold, generating the second travelling strategy using the same travelling trajectory; and when a number of received same second travelling strategies is greater than a preset second number threshold, determine the second travelling strategy as a third travelling strategy, and store the third travelling strategy and the corresponding position,
wherein the one or more programs are executed by the one or more processors to enable the one or more processors further to:
send the third travelling strategy to a second driverless vehicle, such that the second driverless vehicle determines whether the first travelling strategy is able to be generated, and is controlled to travel using the third travelling strategy in response to determining that the first travelling strategy being unable to be generated; and
in response to receiving used reports indicating that the third travelling strategy has been used, record a number of the used reports and a duration of receiving the used reports, and update the high-precision map in response to the number of used reports is greater than a report threshold or the duration is longer than a duration threshold.

9. The server according to claim 8, wherein the one or more programs are executed by the one or more processors to enable the one or more processors to:
when a distance from a second driverless vehicle to a position corresponding to the third travelling strategy is detected to be less than a preset distance threshold, transmit the third travelling strategy to the second driverless vehicle.

10. The server according to claim 9, wherein the one or more programs are executed by the one or more processors to enable the one or more processors to:
when a number of received reports from the second driverless vehicle indicating that the second driverless vehicle does not use the third travelling strategy exceeds a preset third number threshold, delete the third travelling strategy and the corresponding position.

11. The server according to claim 8, wherein the one or more programs are executed by the one or more processors to enable the one or more processors to:
when a number of received reports from a second driverless vehicle indicating that the second driverless vehicle does not use the third travelling strategy exceeds a preset third number threshold, delete the third travelling strategy and the corresponding position.

* * * * *